United States Patent
Kinoshita et al.

(10) Patent No.: US 8,124,046 B2
(45) Date of Patent: Feb. 28, 2012

(54) ALKALI METAL IODIDE SALT SOLUTION AND METHOD FOR PRODUCING THE SAME

(75) Inventors: Yuichiro Kinoshita, Isumi (JP); Sayaka Shiomitsu, Isumi (JP); Keisuke Takahashi, Isumi (JP)

(73) Assignee: Nippon Chemicals Co., Ltd., Tokyo (JP)

( * ) Notice: Subject to any disclaimer, the term of this patent is extended or adjusted under 35 U.S.C. 154(b) by 243 days.

(21) Appl. No.: 12/517,622

(22) PCT Filed: Mar. 11, 2008

(86) PCT No.: PCT/JP2008/054339
§ 371 (c)(1),
(2), (4) Date: Jun. 4, 2009

(87) PCT Pub. No.: WO2008/111574
PCT Pub. Date: Sep. 18, 2008

(65) Prior Publication Data
US 2010/0021369 A1  Jan. 28, 2010

(30) Foreign Application Priority Data
Mar. 13, 2007 (JP) .................................. 2007-063889

(51) Int. Cl.
*C01D 3/12* (2006.01)

(52) U.S. Cl. .................. 423/499.1; 423/179; 423/179.5; 423/200; 423/206.1

(58) Field of Classification Search ............... 423/499.1, 423/499.3, 499.4, 179, 179.5, 200, 206.1
See application file for complete search history.

(56) References Cited

U.S. PATENT DOCUMENTS

| | | | |
|---|---|---|---|
| 3,992,510 A * | 11/1976 | Ishigami et al. | 423/500 |
| 4,145,396 A * | 3/1979 | Grantham | 588/314 |
| 2004/0163840 A1 * | 8/2004 | Kanel et al. | 174/117 F |
| 2009/0041655 A1 | 2/2009 | Shoji et al. | |

FOREIGN PATENT DOCUMENTS

| | | |
|---|---|---|
| JP | 06-157005 | 6/1994 |
| JP | 09-156920 | 6/1997 |
| JP | 2005-047764 | 2/2005 |
| JP | 2006-315904 | 11/2006 |
| WO | WO 2006118280 A1 * | 11/2006 |

OTHER PUBLICATIONS

International Search Report and Written Opinion for corresponding application No. PCT/JP2008/054339 mailed May 20, 2008.

* cited by examiner

*Primary Examiner* — Ngoc-Yen Nguyen
(74) *Attorney, Agent, or Firm* — Renner, Otto, Boisselle & Sklar, LLP

(57) ABSTRACT

A method for producing an alkali metal iodide salt solution including combusting a liquid for combustion so as to combust a combustible component of the liquid for combustion; and subsequently cooling a resultant gas containing a decomposition product. The method comprises the steps of (a) providing a liquid containing (i) an alkali metal iodide salt, (ii) an inorganic-salt-forming substance capable of forming, at combustion, an inorganic salt containing an alkali metal and (iii) an organic compound; (b) adding to the liquid a precipitation solvent capable of depositing the inorganic-salt-forming substance; (c) removing from the liquid the inorganic-salt-forming substance precipitated in the step (b) so as to obtain the liquid for combustion; and (d) combusting the liquid for combustion and subsequently cooling the resultant gas containing a decomposition product. Accordingly, there can be achieved a method for producing a highly pure alkali metal iodide salt solution from a liquid containing an iodine compound.

4 Claims, 1 Drawing Sheet

ALKALI METAL IODIDE SALT SOLUTION AND METHOD FOR PRODUCING THE SAME

TECHNICAL FIELD

The present invention relates to a method for producing a highly pure alkali metal iodide salt solution from a liquid containing an iodine-containing compound. Especially, the present invention relates to a method for producing an alkali metal iodide salt solution with use of a combustion method.

BACKGROUND ART

Iodine is a globally valuable material, which is used as: materials for daily commodities such as contrast mediums for X-ray, pharmaceutical products, anti-microorganism agent/fungicide, and the like; an industrial material for catalyst stabilizers, photographic materials, and the like; and an agricultural material for animal-feed additives, herbicides, and the like. Iodine is generally produced by purifying iodine from a mixture containing either iodine or an iodine compound. It is known that iodine can be purified from, for example, ore, brine, seaweed ash, and waste materials containing either iodine or an iodine compound. Especially, it is highly beneficial to recover valuable iodine from waste materials, in terms of cost, environment, and resource saving. As described above, various products include iodine as their raw materials, intermediates, catalysts, and the like. For example, organic compound synthesis may use iodine in the form of a simple substance or a compound. However, not all the iodine provided to the synthesis contributes to the synthesis. Some of the iodine is left unreacted, and another some of the iodine forms another compound. That is, waste materials produced through a manufacturing process contain iodine as simple iodine or as various inorganic or organic compounds. The waste materials vary in forms such as waste liquids (waste water and waste oil) and sludge. Patent Literature 1 discloses an example of a method for recovering iodine from such waste materials. The method is an iodine recovery method with combustion. In the method of Patent Literature 1, an alkali metal compound and a medium are mixed with a waste material containing iodine or an iodine compound. The mixture is combusted, and then sodium iodide or hydrogen iodide contained in the resultant gas is absorbed by an aqueous alkaline solution. Eventually, iodine is purified from the aqueous alkaline solution which has absorbed the sodium iodide or the hydrogen iodide.
Citation List
Patent Literature 1
Japanese Patent Application Publication, Tokukaihei, No. 6-157005 A (Publication Date: Jun. 3, 1994)

SUMMARY OF INVENTION

Thus purified aqueous alkali metal iodide salt solution is a useful raw material for purifying iodine. Therefore, it is demanded that an aqueous alkali metal iodide salt solution with high purity is produced from a mixture (e.g. a waste material) containing iodine or an iodine compound. However, in general, waste materials contain various undesired substances such as organometal compounds, metal, and organic compounds, other than a desired alkali metal iodide salt. In order to obtain an aqueous alkali metal iodide salt solution with high purity from such a mixture, a combustion method is effective through which organic components are removed from the mixture. With the combustion method, combustible contents can be removed as $CO_2$ gas or $N_2$ gas, etc. Moreover, the combustion method is a useful method through which a highly pure alkali metal iodide salt can be obtained easily by adjusting an amount of the solution used for recovering the alkali metal iodide salt. Examples of a combustion furnace are a swirling furnace, a fluidized combustion furnace, a kiln furnace, a submerged combustion furnace, etc. Especially, in a case where the mixture is liquid, the submerged combustion furnace is superior to the others, because the submerged combustion furnace allows easy feeding of the mixture in the liquid form and continuous recovery of an aqueous alkali metal iodide salt solution with easy adjustment in concentration. Moreover, even in a case where the mixture is solid, a same kind of process can be carried out with mixing the mixture with a liquid before the combustion.

In a case where such a submerged combustion method is adopted to obtain a highly pure alkali metal iodide salt solution, the following problems may occur when the mixture is combusted directly. For example, another alkali metal salt would possibly be formed by reaction of decomposition products generated at combustion of the mixture. In general, an alkali metal salt has a high melting point. The alkali metal salt would possibly be adhered (solidified) on an inner wall of a furnace depending on a temperature inside the furnace. Thus solidified alkali metal salt would possibly fall into a subject solution by its own weight. This sometimes causes a phreatic explosion, whereby a production of the aqueous alkali metal iodide salt solution is prevented. Further, when the solidification of the high-melting point product is occurred at a feed opening for a liquid, the feed opening (nozzle) would be clogged. This prevents feeding of the liquid, whereby the process itself is inevitably stopped.

Such problems would possibly occur depending on kinds of substances contained in a mixture, or on capabilities of a furnace. Therefore, there has been a need for a development of a method for producing a highly pure alkali metal iodide salt solution from a mixture containing iodine or an iodine compound, regardless of components contained in the mixture and of capabilities of a furnace to be used.

The present invention is attained in consideration of the above problems. An object to be achieved is to provide a method for producing a highly pure alkali metal iodide salt solution from a liquid containing iodine or an iodine compound.

A method for producing an alkali metal iodide salt solution of the present invention is a method for producing an alkali metal iodide salt solution through combustion of a liquid for combustion, includes providing the liquid for combustion by removing a compound from a liquid containing (i) the compound and (ii) at least one of iodine and an iodine compound, the compound being capable of forming, at combustion, an inorganic salt containing an alkali metal.

Note that, in the present invention, the "inorganic salt containing an alkali metal" indicates compounds other than an alkali metal iodide salt. The "compound capable of forming, at combustion, an inorganic salt containing an alkali metal" and an "inorganic-salt-forming substance capable of forming, at combustion, an inorganic salt containing an alkali metal" (explained later) indicate compounds including elemental components capable of forming, at combustion, an inorganic salt containing an alkali metal.

The method for producing an alkali metal iodide solution of the present invention is preferable to include, before removing the compounds from the liquid, distilling off a solvent, which is contained in the liquid and dissolves the compounds.

The method for producing an alkali metal iodide solution of the present invention is preferable to include, before removing the compounds, adding a deposition solvent to the liquid for depositing the compounds.

Note that, in the present invention, the "removal of a solvent by distillation" includes a case where at least a part of the solvent in the liquid is distilled off. That is, not all of the solvent in the liquid need to be distilled off. Note that, in the present invention, the "solvent" indicates a solvent capable of dissolving at least a part of alkali metal salt and an inorganic-salt-forming substance. Note that, in distilling the solvent off, a general distillation such as an atmospheric distillation or a vacuum distillation can be performed.

In the method for producing an alkali metal iodide salt solution of the present invention, an inorganic-salt-forming substance is removed from the liquid. The inorganic-salt-forming substance is capable of forming, at combustion, an inorganic salt containing an alkali metal. In general, an inorganic salt containing an alkali metal has a high melting point. Therefore, it is demanded that the inorganic salt would not be formed inside the furnace at combustion. In the present invention, formation, at combustion, of an inorganic salt having high melting point is prevented with use of a liquid for combustion from which the inorganic-salt-forming substance has been removed.

Moreover, a method for producing an alkali metal iodide salt solution of the present invention is a method for producing an alkali metal iodide salt solution including combusting a liquid for combustion so as to combust a combustible component of the liquid for combustion; and subsequently cooling a resultant gas containing a decomposition product, includes: (a) providing a liquid containing (i) an alkali metal iodide salt, (ii) an inorganic-salt-forming substance capable of forming, at combustion, an inorganic salt containing an alkali metal and (iii) an organic compound; (b) adding to the liquid a precipitation solvent capable of precipitating the inorganic-salt-forming substance; (c) removing from the liquid the inorganic-salt-forming substance precipitated in the step (b) so as to obtain the liquid for combustion; and (d) combusting the liquid for combustion and subsequently cooling the resultant gas containing a decomposition product.

It is preferable that the method for producing an alkali metal iodide salt solution of the present invention further includes: distilling off the solvent in the liquid before and after the step (b).

Note that, "before or after the step (b)" indicates the cases of "before the step (b)", "after the step (b)" and "both before and after the step (b)".

In the method for producing an alkali metal iodide salt solution of the present invention, a melting point of the inorganic salt containing an alkali metal is higher than 1000° C.

In the method for producing an alkali metal iodide salt solution of the present invention, it is preferable that the deposition solvent is water.

In the method for producing an alkali metal iodide salt solution of the present invention, it is preferable that the deposition solvent is water at a temperature not lower than 50° C. but not higher than 100° C.

In the method for producing an alkali metal iodide salt solution of the present invention, the inorganic salt containing an alkali metal is a compound containing at least one of a phosphorus element, a boron element, and a silicon element.

In the method for producing an alkali metal iodide salt solution of the present invention, the inorganic-salt-forming substance capable of forming, at combustion, an inorganic salt containing an alkali metal is deposited in the step (b), and thus deposited inorganic-salt-forming substance is removed in the step (c). In general, an inorganic salt containing an alkali metal has a high melting point. Therefore, it is demanded that the inorganic salt would not be formed inside the furnace at combustion. In the present invention, the steps (b) and (c) prevent formation, at combustion, of the inorganic salt having high melting point. This makes it possible to obtain a liquid for combustion, which contains fewer amounts of substances to cause an inorganic salt containing an alkali metal in a furnace. With use of the liquid for combustion, the step (d) prevents formation of an inorganic salt containing an alkali metal in a furnace, resulting in a good combustion process. On this account, a highly pure alkali metal iodide salt solution can be obtained.

Further, in the method of the present invention, the solvent in the liquid is distilled off. This improves an effect of addition of the deposition solvent. Particularly, the removal of the solvent by distillation decreases a content rate of an organic solvent which raises temperature in the furnace. On this account, temperature increase in the furnace can be prevented. For example, the temperature in the furnace can be controlled within 1000° C., whereby generation of $NO_X$ can be prevented. Moreover, the temperature increase in the furnace can be prevented as described above, and this prevents deterioration of fireproof bricks which constitute the furnace.

An alkali metal iodide salt solution of the present invention is produced by the above described methods. This can provide an alkali metal iodide salt solution which has a high purity and can be suitably used for an iodine recovery process.

In a method for iodine recovery of the present invention, chlorine is added to the alkali metal iodide salt solution, and then a heat melting is performed. In the method for iodine recovery of the present invention, a highly pure alkali metal iodide salt solution is used, whereby highly pure iodine can be purified.

For a fuller understanding of the nature and advantages of the invention, reference should be made to the ensuing detailed description taken in conjunction with the accompanying drawings.

REFERENCE SIGNS LIST

Figure 1:
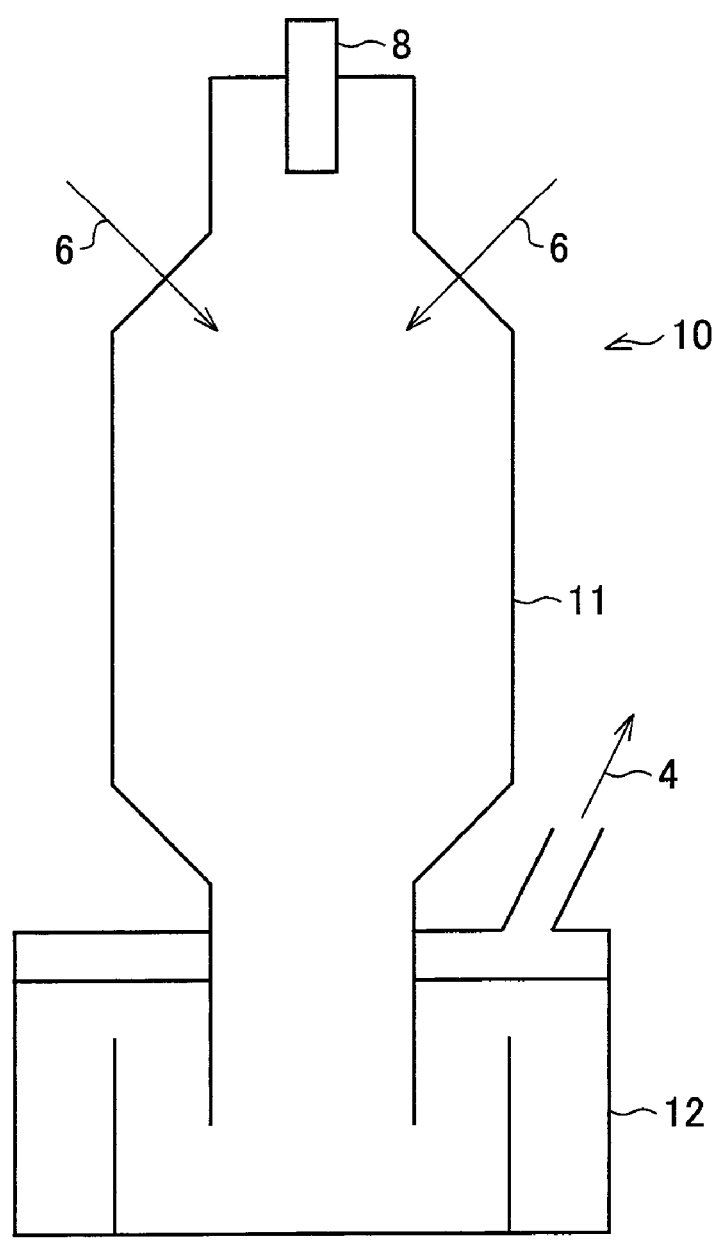
FIG. 1
FIG. 1 is a cross-sectional view illustrating a combustion device used in an embodiment of the present invention.

8: Auxiliary Burner
10: Submerged Combustion Furnace
11: Main Body of Combustion Furnace
12: Cooling Can

DESCRIPTION OF EMBODIMENTS

1. Alkali Metal Iodide Salt Solution and Method for Producing the Same

The following explains a method for producing an alkali metal iodide salt solution of the present embodiment. The method for producing an alkali metal iodide salt solution of the present embodiment is a method wherein, with use of a submerged combustion furnace, a liquid for combustion is combusted to thereby combust a combustible component of the liquid for combustion and the resultant gas containing a decomposition product is cooled, including steps of: (a) preparing a liquid containing (i) an alkali metal iodide salt, (ii) an inorganic-salt-forming substance capable of forming, at combustion, an inorganic salt containing an alkali metal and (iii) an organic compound; (b) adding to the liquid a precipitation solvent capable of precipitating the inorganic-salt-forming substance; (c) removing from the liquid the inorganic-salt-forming substance precipitated in the step (b) to thereby obtain a liquid for combustion; and (d) combusting the liquid for combustion and subsequently cooling the resultant gas containing a decomposition product.

The following explains each of the steps.

Step (a):

First, a liquid containing an iodine compound is prepared. The liquid may be, for example, a waste liquid from a chemical synthesis including an iodination reaction. The waste liquid may include unreacted iodine, a starting material, a catalyst, an organic compound such as a solvent, and an inorganic compound. Here, the term "prepare" indicates to establish a condition ready for the step (b) (explained later). For example, obtaining a waste liquid corresponds to the step of preparing the liquid.

Such waste liquid from the chemical synthesis is obtained. Particularly, the liquid (the waste liquid from the chemical synthesis to be obtained) of the present embodiment contains an alkali metal iodide salt and an inorganic-salt-forming substance capable of forming, at combustion, an inorganic salt containing an alkali metal. The alkali metal iodide salt contained in the liquid is, for example, sodium iodide (NaI), potassium iodide (KI), or the like. The inorganic-salt-forming substance capable of forming an inorganic salt containing an alkali metal at combustion is a compound containing an elemental component capable of reacting with alkali metal iodide or other alkali metal salts under a combustion atmosphere (heat-treating atmosphere). More specifically, the inorganic-salt-forming substance is an organophosphorous compound, an organoboron compound, or an organosilicon compound. Note that, at least a part of the respective compounds is dissolved in the liquid.

Examples of the inorganic salt containing an alkali metal are sodium phosphate, sodium borate, sodium silicate, and the like. These compounds have a melting point over 1000° C.

For example, a compound containing at least one of a phosphorus element, a boron element, and a silicon element generates at combustion a substance capable of forming an alkali metal-containing inorganic salt having a melting point of higher than 1000° C. Examples of the organophosphorous compound are triphenylphosphine, triphenyl phosphate, and triphenylphosphine oxide. Examples of the organoboron compound are triarylboron, and the like. Examples of the organosilicon compound are triethylsilanol, and the like.

Moreover, an organic compound contained in the liquid of the present embodiment is an organic solvent such as methanol, cyclohexane, tetrahydrofuran, dimethyl sulfoxide, diethylamine, dimethylformamide, isobutanol, or the like. The organic compound is an organic compound other than the inorganic-salt-forming substance (the organophosphorous compound, the organoboron compound, the organosilicon compound, or the like).

Step (b):

Next, the inorganic-salt-forming substance in the liquid is deposited. More specifically, a solvent (deposition solvent) having a low solubility of the inorganic-salt-forming substance is added to the liquid. This deposits the inorganic-salt-forming substance in the liquid. The deposition solvent is not limited as long as it can deposit the inorganic-salt-forming substance. For example, water may be suitably used as the deposition solvent. Note that, the water may contain a compound other than water to the extent that the water can achieve the above described function. Examples of the compound to be mixed in the water are acid and alkali for pH control such as hydrochloric acid, vitriolic acid, sodium hydroxide, potassium hydroxide, and the like.

Moreover, depending on a contained amount of the solvent in the liquid, it is preferable in the step (b) that the solvent is distilled off. The solvent can be distilled off by a general distillation operation under a normal pressure or a reduced pressure condition. Here, particular examples of the solvent, which are preferable to be distilled off, are methanol, cyclohexane, tetrahydrofuran, dimethylformamide, dimethyl sulfoxide, diethylamine, and isobutanol. The removal of the solvent via distillation makes it possible to prepare a liquid for combustion, which can be combusted with a furnace chosen regardless of its capabilities (e.g. fire resistance). Further, the removal of solvent by distillation decreases the solubility of the organophosphorous compound or the organoboron compound. This makes it easy to deposit the inorganic-salt-forming substance. Note that, as long as at least a part of the solvent can be removed from the liquid explained in the step (a), this is regarded as the "removal of the solvent by distillation" in the present invention.

The solvent is preferable to be distilled off before adding the deposition solvent. Further, in a case where the solvent is distilled off before adding the deposition solvent, it is preferable that water at an temperature not lower than 50° C. but not higher than 100° C. is used as the deposition solvent, so that a temperature difference between the water and the liquid heated by the distillation operation would not become large. More preferably, the temperature of the water is not lower than 60° C. but not higher than 95° C. Further preferably, the temperature of the water is not lower than 75° C. but not higher than 85° C. In the case where the water temperature is 50° C. or higher, it becomes easy to control the deposition condition. Moreover, in the case where the water temperature is 100° C. or less, there is no need to perform troublesome operations for maintaining the temperature. On this account, a crystalline precipitate can be obtained without rapidly decreasing the temperature of the liquid after the distillation operation. For example, in a case where the temperature of the liquid is decreased rapidly by the addition of the precipitation solvent, a precipitate forms in a cake-shape. This may prevent a good filtration, and also may damage the device (damage an agitation axis and a baffle). However, as described above, such a problem can be avoided by adding the water having the prescribed temperature. Particularly, in an industrial application of the present production method, the cake-shaped precipitate may cause a clog in a device (e.g. a pipe and a filter) for performing a filtration step (explained later). However, the addition of the water in the temperature range allows precipitation of a crystalline precipitate. On this account, the problems can be avoided even when the present production method is applied to an industrial production.

Step (c):

The resultant deposit by addition of the deposition solvent is removed. The removal can be performed by, for example, filtration. As described, the precipitate, which is containing an inorganic-salt-forming substance capable of forming, at combustion, an inorganic salt containing an alkali metal, is removed. This can prevent formation, at combustion, of an inorganic salt containing an alkali metal in a furnace. It is particularly required, in the furnace, to prevent formation of an inorganic salt containing an alkali metal having a melting point of higher than 1000° C. The liquid for combustion can be prepared through the steps (a) to (c).

Note that, the removal of the solvent by distillation explained in the step (b) may be performed at any of the following timings: before adding the deposition solvent; after removing the deposit generated by addition of the deposition solvent; and before removing the deposit generated by addition of the deposition solvent. However, as described above, in the case where the "removal of the solvent by distillation" is performed before adding the deposition solvent, a temperature of the deposition solvent is preferable to be controlled.

Step (d):

Next, in the step (d), an alkali metal iodide salt solution is obtained through combustion of the liquid for combustion and subsequent cooling of the resultant gas containing decomposition products. First, a submerged combustion furnace used in this step is explained. A submerged combustion furnace 10 includes a main body of combustion furnace 11 and a cooling can 12. The main body of combustion furnace 11 is used for combusting the liquid for combustion with auxiliary fuel and combustible gas. The cooling can 12 is provided on the bottom of the main body of combustion furnace 11. The resultant gas, which contains decomposition products and comes down from the main body of combustion furnace 11, is collected by the cooling can 12. Note that, FIG. 1 shows only the submerged combustion furnace 10. However, in a whole system of the submerged combustion furnace, generally known various configurations such as an exhaust gas collecting system (not illustrated) are incorporated. On an upper section of the main body of combustion furnace 11, an auxiliary burner 8 and feed openings (not illustrated) are provided. The feed openings are used for feeding the combustible gas and the liquid for combustion. The combustible gas and the liquid for combustion are fed along arrows 6 into the main body of combustion furnace 11.

The liquid for combustion is fed into the combustion furnace, whereby combustible materials in the liquid for combustion are combusted. More specifically, organic components (e.g. C and H) contained in the liquid for combustion are oxidatively decomposed completely. Exhaust gas is fed along an arrow 4 into an exhaust gas processing system (not illustrated). Then, heat-treated gas containing iodine or alkali metal iodide is guided into the cooling can 12. The cooling can 12 contains water whose (i) pH is not less than 7 but not more than 13 and (ii) temperature is not lower than 5° C. but lower than 100° C. The heat-treated gas enters in the cooling can 12 to be contacted with the water, whereby an alkali metal iodide salt solution can be obtained. Further, free iodine generated in the heat-treated gas has low solubility in water. This may cause exhaust of free iodine together with exhausted gas. In order to prevent decrease of recovery rate by the exhaust, it is preferable that a reducing agent in a range of not less than 0.1% by weight but not more than 5% by weight is added to the water in the cooling can 12. Examples of the reducing agent are sodium subsulfite, sodium sulfite, and sodium bisulfite.

The above steps remove impurities, whereby a highly pure alkali metal iodide salt solution can be obtained.

In the method for producing an alkali metal iodide salt solution of the present embodiment, an inorganic-salt-forming substance capable of forming, at combustion, an inorganic salt containing an alkali metal is deposited in the step (b), and the deposited inorganic-salt-forming substance is removed in the step (c). This can prepare a liquid for combustion containing fewer substances which are capable of generating an alkali metal inorganic salt in a furnace. The step (d) is performed with use of the liquid for combustion, whereby formation of reaction products in the furnace can be prevented. This leads to a good combustion treatment. Consequently, a highly pure alkali metal iodide salt solution can be obtained.

Next, a method for producing an alkali metal iodide solution in another embodiment of the present invention is explained. The method for producing alkali metal iodide solution in the present embodiment is a method for producing an alkali metal iodide salt solution through combustion of a liquid for combustion, wherein: the liquid for combustion is obtained by removing a compound from a liquid containing (i) the compound and (ii) at least one of iodine and an iodine compound, the compound being capable of forming, at combustion, an inorganic salt containing an alkali metal.

Regarding the liquid containing (i) a compound (inorganic-salt-forming substance) capable of forming, at combustion, an inorganic salt containing an alkali metal and (ii) at least one of iodine and an iodine compound, the explanation of the step (a) can be applied correspondingly. Moreover, in the explanation of the step (a), a waste liquid from a chemical synthesis including an iodination reaction is used for the example. However, it is sufficient that at least one of iodine and an iodine compound is contained in the liquid.

Regarding the method for removing the compounds (inorganic-salt-forming substance), the explanation of the step (c) can be applied correspondingly. Moreover, other than the method, the following methods can be used. The methods are, for example: a distillation method with use of such as steam distillation and azeotropic distillation; an adsorption method with use of such as activated carbon and zeolite; and an extraction in which a difference of solubility is utilized. Especially, the deposition method in which the compounds are deposited and removed is preferable.

Moreover, in the present invention, it is preferable that the solvent, which is contained in the liquid and dissolves a compound (inorganic-salt-forming substance), is distilled off before removing the compound. Regarding the removal of the solvent by distillation, the explanations of the step (b) and the step (c) can be applied correspondingly.

Moreover, in the present invention, it is preferable that, before removing a compound (inorganic-salt-forming substance), a deposition solvent for depositing the compound is added to the liquid. This makes it possible to deposit the compound in the liquid. Regarding the deposition of the compound (inorganic-salt-forming substance) and the deposition solvent, the explanation of the step (b) can be applied correspondingly. Moreover, other than this method, the following methods can be used. The methods are, for example: a method for distilling off a solvent in which a compound (inorganic-salt-forming substance) is dissolved; and a method for depositing an inorganic-salt-forming substance by cooling the substance excessively. Especially, the method in which a deposition solvent is added is preferable. It is further preferable to perform both the removal by distillation and addition of the deposition solvent.

2. Preparation of Iodine

Next, a method for recovering iodine from the obtained alkali metal iodide salt solution is explained. A generally known method can be used for the recovery of iodine. For example, iodine can be recovered in the following steps: first, pH of the alkali metal iodide salt solution is adjusted; next, chlorine is blown in for precipitating free iodine; and then, melt preparation of iodine is performed. Purity of thus recovered iodine is in a range of 99.5% to 99.9%.

Through the above steps, iodine can be recovered from an alkali metal iodide salt solution.

Moreover, other than the above described chlorine oxidation method for recovering iodine, the following methods can be used. Examples of the methods are: oxidation methods with use of sulfuric acid and manganese dioxide; a oxidation method with use of sodium nitrite; and a oxidation method with use of a calcium hypochlorite solution.

In the method according to the present invention for recovering iodine, the alkali metal iodide salt solution prepared through the operations described above is used. This makes it possible to recover iodine with high purity.

EXAMPLES

The present invention is explained with reference to examples. Note that, the present invention is not limited to the following examples.

Example 1

First, a liquid composed of components shown in Table 1 below was prepared. Moreover, in Example 1 and Example 2, components of compounds shown in the tables are measured by the following methods.
(Sodium Iodide)
Sodium iodide was measured by a titration method in which an aqueous 0.1N $AgNO_3$ solution is used as a reagent.
(Triphenylphosphine Oxide)
  Column: TOSOH ODS-80TM 4.6×150 mm
  Column temperature: 40° C.
  Carrier:acetonitrile:water=4:6 (v:v) (TEA-AcOH 0.1 vol %)
  Flow rate: 1.0 mL/min
  Detection wavelength: 230 nm
  Internal Control: dimethyl phthalate
(Methanol, Dimethylformamide, Isobutanol, and Water)
  Column: chromosolve 102, 1.1 m
  Column temperature: 70° C.→20° C./min→200° C. (13 min)
  Carrier: He (40 mL/min)
  Detection: TCD (75 mA)
  Internal Control: acetonitrile

TABLE 1

| Sodium iodide (NaI) | 14.0 g |
| Methanol (MeOH) | 12.6 g |
| Dimethylformamide (DMF) | 76.4 g |
| Isobutanol (i-BuOH) | 30.6 g |
| Triphenylphosphine oxide (TPPO) | 19.6 g |
| Water ($H_2O$) | 16.8 g |

A reduced-pressure distillation was performed on the liquid to remove the solvent, under the condition of: 13 kPa; steam temperature in a range of 45° C. to 85° C. With this, MeOH 12.6 g, DMF 58.1 g, i-BuOH 30.4 g, and $H_2O$ 11.4 g were distilled off. Next, water of 80° C. was added by 144.1 g as a deposition solvent. With this, TPPO was deposited and the deposited TPPO was filtered. Through the operation, a liquid for combustion was obtained. Table 2 below shows the composition of the liquid at the time.

TABLE 2

| Sodium iodide (NaI) | 13.7 g (residual rate 97.9%) |
| Methanol (MeOH) | 0.0 g (removal rate 100%) |
| Dimethylformamide (DMF) | 18.3 g (removal rate 76.1%) |
| Isobutanol (i-BuOH) | 0.2 g (removal rate 99.3%) |
| Triphenylphosphine oxide (TPPO) | 0.5 g (removal rate 97.4%) |
| Water ($H_2O$) | 149.5 g |

As shown in comparison of Tables 1 and 2, in the liquid for combustion obtained in Example 1, the organic solvent content (content of dimethylformamide and isobutanol, etc.) is drastically decreased. Moreover, the triphenylphosphine oxide content (the inorganic-salt-forming substance capable of forming, at combustion, an inorganic salt containing an alkali metal) was also decreased. Further, the sodium iodide content was hardly changed. That is, sodium iodide was recovered effectively.

Example 2

A liquid, which is composed of components shown in Table 3 below, was prepared.

TABLE 3

| Sodium iodide (NaI) | 2.9 kg |
| Methanol (MeOH) | 2.7 kg |
| Dimethylformamide (DMF) | 15.8 kg |
| Isobutanol (i-BuOH) | 6.1 kg |
| Triphenylphosphine oxide (TPPO) | 4.0 kg |
| Water ($H_2O$) | 3.5 kg |

A reduced-pressure distillation was performed on the liquid to remove the solvent, under the condition of: 13 kPa; steam temperature in a range of 45° C. to 85° C. With this, MeOH 2.7 kg, DMF 11.7 kg, i-BuOH 6.1 kg, and $H_2O$ 2.3 kg were distilled off. Next, water of 80° C. was added by 26.2 kg as a deposition solvent. With this, TPPO was deposited and the deposited TPPO was filtered. Through the operation, a liquid for combustion was obtained. Table 4 below shows the composition of the liquid at the time.

TABLE 4

| Sodium iodide (NaI) | 2.77 kg (residual rate 95.0%) |
| Methanol (MeOH) | 0.0 kg (removal rate 100%) |
| Dimethylformamide (DMF) | 4.14 kg (removal rate 73.8%) |
| Isobutanol (i-BuOH) | 0.0 kg (removal rate 100%) |
| Triphenylphosphine oxide (TPPO) | 0.07 kg (removal rate 98.3%) |
| Water ($H_2O$) | 27.4 kg |

With use of 15 L (18 kg) of the liquid for combustion, a submerged combustion was performed at temperature in a range of 900° C. to 1000° C. The resultant gas was absorbed by cooling water containing sodium sulfite of 2% by weight. This produced 14 L of a purified aqueous sodium iodide solution. Sodium iodide dissolved in the aqueous solution was 1.37 kg. Moreover, there appeared neither high melting point substances adhered on inside of the submerged combustion furnace nor clog in the nozzle. Therefore, a good operation status was secured.

Next, the resultant aqueous sodium iodide solution was oxidized with chlorine, and subsequently iodine was recovered through a purifying treatment. Purity of thus recovered iodine was 99.8%. Note that, the fixed quantity of the iodine was measured after reduction with an aqueous 0.1N sodium thiosulfate solution.

The present invention is not limited to the description of the embodiments above, but may be altered by a skilled person within the scope of the claims. An embodiment based on a proper combination of technical means disclosed in different embodiments is encompassed in the technical scope of the present invention.

With the method for producing an alkali metal iodide salt solution of the present invention, as described above, formation of an inorganic salt containing an alkali metal (i.e. one of high melting point substances) at the submerged combustion is prevented through the step (b) and the step (c). Particularly, those steps prevent formation of high melting point substances having melting points of higher than 1000° C. This brings about effects that a good submerged combustion treatment can be performed and a highly pure alkali metal iodide salt solution can be produced.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

With the present invention, a highly pure alkali metal iodide salt solution can be produced from a liquid containing an alkali metal iodide salt, regardless of capabilities of a furnace and impurities.

The invention claimed is:

1. A method for producing an alkali metal iodide salt solution including combusting a liquid for combustion so as to combust a combustible component of the liquid for combustion; and subsequently cooling a resultant gas containing a decomposition product, comprising:
  (a) providing a liquid containing (i) an alkali metal iodide salt, (ii) an inorganic-salt-forming substance capable of forming, at combustion, an inorganic salt containing an alkali metal and (iii) an organic compound;
  (b) adding to the liquid a deposition solvent to deposit the inorganic-salt-forming substance;
  (c) removing from the liquid the inorganic-salt-forming substance deposited in the step (b) so as to obtain the liquid for combustion;
  (d) combusting the liquid for combustion to form a resultant gas containing a decomposition product and subsequently cooling the resultant gas containing the decomposition product to produce the alkali metal iodide salt solution; and
  wherein the organic compound (iii) comprises an organic solvent, and the method further comprises distilling off the organic solvent in the liquid before or after the step (b).

2. The method for producing as set forth in claim 1, wherein: the deposition solvent is water.

3. The method for producing as set forth in claim 1, further comprising:
  distilling off the solvent in the liquid before the step (b), wherein:
  the deposition solvent is water at a temperature not lower than 50° C. but not higher than 100° C.

4. The method for producing as set forth in claim 1, wherein:
  the inorganic salt containing an alkali metal contains at least one selected from a phosphorus element, a boron element, and a silicon element.

* * * * *

UNITED STATES PATENT AND TRADEMARK OFFICE
CERTIFICATE OF CORRECTION

PATENT NO.         : 8,124,046 B2
APPLICATION NO.    : 12/517622
DATED              : February 28, 2012
INVENTOR(S)        : Yuichiro Kinoshita, Sayaka Shiomitsu and Keisuke Takahashi It is certified that error appears in the above-identified patent and that said Letters Patent is hereby corrected as shown below:

On the Title page:

Item (73), Assignee:
"Nippon Chemical Co., Ltd., Tokyo (JP)" should read
-- Nippoh Chemical Co., Ltd. Tokyo (JP) --

Signed and Sealed this
Tenth Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,124,046 B2
APPLICATION NO. : 12/517622
DATED : February 28, 2012
INVENTOR(S) : Yuichiro Kinoshita, Sayaka Shiomitsu and Keisuke Takahashi Page 1 of 1

It is certified that error appears in the above-identified patent and that said Letters Patent is hereby corrected as shown below:

On the Title page:

Item (73), Assignee:
"Nippon Chemical Co., Ltd., Tokyo (JP)" should read
-- Nippoh Chemicals Co., Ltd. Tokyo (JP) --

This certificate supersedes the Certificate of Correction issued July 10, 2012.

Signed and Sealed this
Twenty-eighth Day of August, 2012

David J. Kappos
*Director of the United States Patent and Trademark Office*